United States Patent
Nakagawa et al.

(10) Patent No.: US 8,806,856 B2
(45) Date of Patent: Aug. 19, 2014

(54) CONTROL APPARATUS FOR INTERNAL COMBUSTION ENGINE

(75) Inventors: Norihisa Nakagawa, Numazu (JP);
Takashi Nishikiori, Susono (JP);
Yasuyuki Shibata, Susono (JP); Shinya Misaka, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/522,462

(22) PCT Filed: Mar. 2, 2010

(86) PCT No.: PCT/JP2010/053333
§ 371 (c)(1),
(2), (4) Date: Jul. 16, 2012

(87) PCT Pub. No.: WO2011/108075
PCT Pub. Date: Sep. 9, 2011

(65) Prior Publication Data
US 2012/0291423 A1 Nov. 22, 2012

(51) Int. Cl.
*F01N 11/00* (2006.01)

(52) U.S. Cl.
USPC ............ 60/285; 60/276; 60/277; 60/289; 60/298; 60/299

(58) Field of Classification Search
USPC .......... 60/276, 277, 282, 285, 286, 289, 298, 60/299
See application file for complete search history.

(56) References Cited

U.S. PATENT DOCUMENTS

| | | | |
|---|---|---|---|
| 5,787,855 A | 8/1998 | Mueller et al. | |
| 6,526,745 B1 | 3/2003 | Ogiso | |
| 2004/0050036 A1* | 3/2004 | Ueda et al. | 60/285 |
| 2009/0048763 A1* | 2/2009 | Nishikiori et al. | 701/103 |

FOREIGN PATENT DOCUMENTS

| | | |
|---|---|---|
| JP | 5 31320 | 2/1993 |
| JP | 8 158857 | 6/1996 |
| JP | 8 291724 | 11/1996 |
| JP | 2000 34941 | 2/2000 |

(Continued)

OTHER PUBLICATIONS

International Search Report Issued Apr. 6, 2010 in PCT/JP10/053333 Filed Mar. 2, 2010.

*Primary Examiner* — Thomas Denion
*Assistant Examiner* — Jorge Leon, Jr.
(74) *Attorney, Agent, or Firm* — Oblon, Spivak, McClelland, Maier & Neustadt, L.L.P.

(57) ABSTRACT

Provided is a control apparatus for an internal combustion engine that can favorably achieve compatibility between suppressing deterioration of a catalyst and suppressing progression of rich poisoning thereof when the internal combustion engine has a configuration that performs valve stopping control during a fuel-cut operation. Variable valve operating apparatuses are provided having valve stop mechanisms that can respectively change an operating state of an intake valve and an exhaust valve between a valve operating state and a closed-valve stopped state. When an integrated fuel injection amount is equal to or greater than a predetermined value β when executing a fuel-cut operation, it is determined that rich poisoning of an upstream catalyst is in a progressed state. In that case, valve stopping control of the intake and exhaust valves is prohibited to thereby supply oxygen to the upstream catalyst.

10 Claims, 6 Drawing Sheets

(56) References Cited

FOREIGN PATENT DOCUMENTS

| JP | 2001 90564 | 4/2001 |
| JP | 2001 182570 | 7/2001 |
| JP | 2003 74385 | 3/2003 |
| JP | 2003 307122 | 10/2003 |
| JP | 2004 169646 | 6/2004 |
| JP | 2007321665 A * | 12/2007 |
| JP | 2009 103017 | 5/2009 |

* cited by examiner

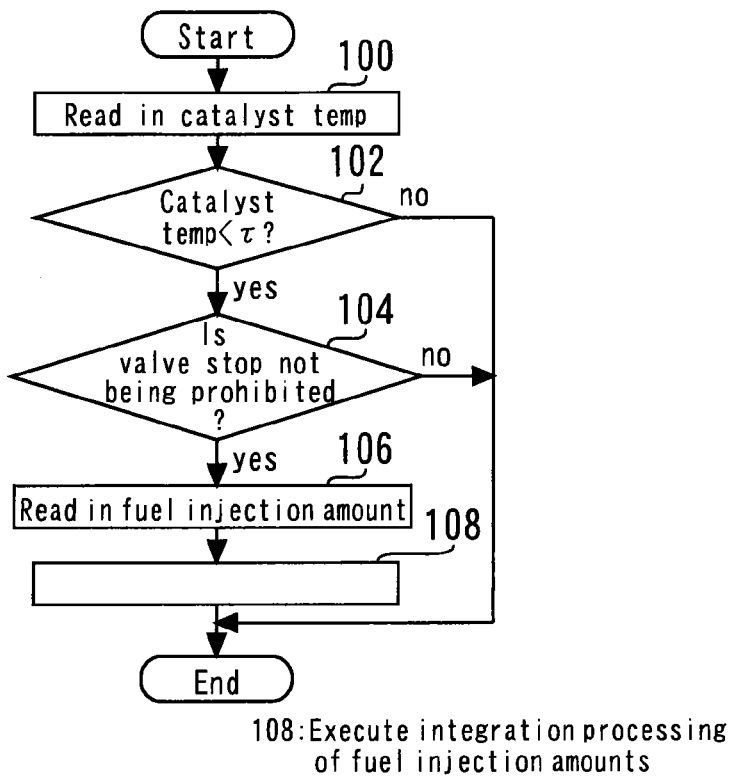
108: Execute integration processing of fuel injection amounts
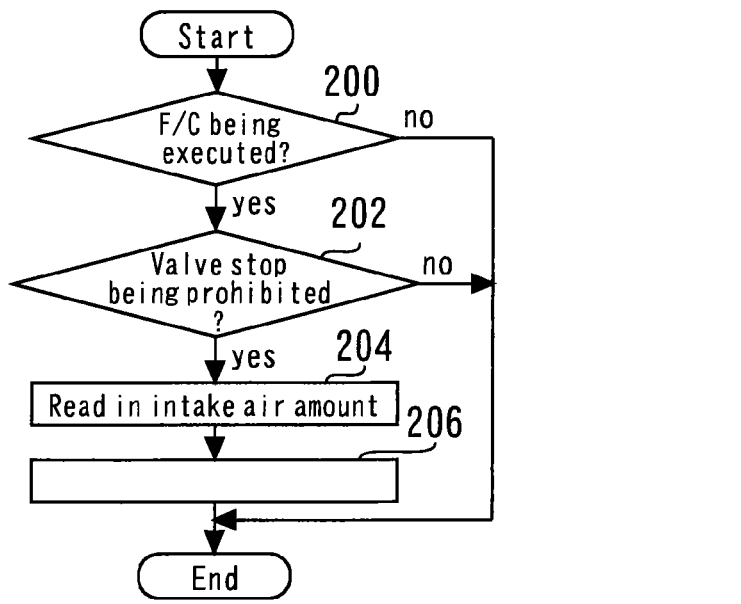
206: Execute integration processing of intake air amounts 304 : Read in integrated fuel injection amount
306 : Is integrated fuel injection amount $\geq \beta$ ?
310 : Clear integrated fuel injection amount
314 : Is sub $O_2$ sensor output lean ?
316 : Read in integrated intake air amount
318 : Is integrated intake air amount $\geq \alpha$ ?
320 : Release prohibition of valve stopping
322 : Clear integrated intake air amount

CONTROL APPARATUS FOR INTERNAL COMBUSTION ENGINE

TECHNICAL FIELD

The present invention relates to a control apparatus for an internal combustion engine, and more particularly to a control apparatus for an internal combustion engine that is equipped with a valve stop mechanism that is capable of maintaining at least one of an intake valve and an exhaust valve in a closed-valve stopped state.

BACKGROUND ART

A conventional internal combustion engine that has a variable valve operating mechanism (valve stop mechanism) that is capable of maintaining at least one of an intake valve and an exhaust valve in a closed state is disclosed, for example, in Patent Document 1. In this conventional internal combustion engine, a configuration is adopted so as to control the variable valve operating mechanism so as to place at least one of the exhaust valve and the intake valve in a closed state when a fuel-cut operation is performed in a situation in which the temperature of an exhaust purification catalyst that is arranged in an exhaust passage is equal to or greater than a predetermined temperature.

The applicants are aware of the following documents, which includes the above described document, as documents related to the present invention.

CITATION LIST

Patent Documents

Patent Document 1: Japanese Laid-open Patent Application Publication No. 2001-182570
Patent Literature 2: Japanese Laid-open Patent Application Publication No. 2000-034941
Patent Literature 3: Japanese Laid-open Patent Application Publication No. Hei 8-291724
Patent Literature 4: Japanese Laid-open Patent Application Publication No. 2001-090564
Patent Literature 5: Japanese Laid-open Patent Application Publication No. 2009-103017

SUMMARY OF INVENTION

Technical Problem

According to the aforementioned conventional control, the supply of oxygen to a catalyst that is in a high-temperature state is prevented, and thus deterioration of the catalyst can be suppressed. However, there is a problem that, when the supply of oxygen to the catalyst is blocked, a precious metal of the catalyst is covered by reduction components in the exhaust gas such as HC or CO, and as a result a phenomenon (rich poisoning) in which the purification capability of the catalyst decreases is liable to occur. If such kind of rich poisoning progresses, exhaust emissions deteriorate due to the decrease in the purification capability of the catalyst. When a configuration is adopted so as to perform valve stopping control during a fuel-cut operation by the above described conventional control in a state in which rich poisoning of the catalyst is progressing, because the supply of oxygen to the catalyst is blocked, a fuel-cut operation can no longer be utilized as an opportunity to recover from rich poisoning. Thus, with respect to a technique that performs valve stopping control during a fuel-cut operation, there is a need to achieve compatibility with respect to suppressing both deterioration and rich poisoning of a catalyst. The aforementioned conventional technology still has room for improvement with regard to this point.

The present invention has been conceived to solve the above described problem, and an object of the present invention is to provide a control apparatus for an internal combustion engine that, in the case of an internal combustion engine having a configuration that performs valve stopping control during a fuel-cut operation, can favorably achieve compatibility with respect to both suppressing deterioration of a catalyst and suppressing progression of rich poisoning thereof.

Solution to Problem

A first aspect of the present invention is a control apparatus for an internal combustion engine, comprising:
a valve stop mechanism that is capable of changing an operating state of at least one valve among an intake valve and an exhaust valve between a valve operating state and a closed-valve stopped state;
fuel-cut operation execution means that executes a fuel-cut operation in a case where a predetermined execution condition is established during operation of the internal combustion engine;
valve stopping execution means that performs valve stopping control that changes an operating state of the at least one valve to the closed-valve stopped state when executing the fuel-cut operation;
poisoning correlation value acquisition means that acquires a poisoning correlation value that has a correlation with progression of rich poisoning of a catalyst that is arranged in an exhaust passage of the internal combustion engine;
poisoning determination means that determines whether or not rich poisoning of the catalyst has progressed based on the poisoning correlation value; and
oxygen supply means that supplies oxygen to the catalyst in a case where it is determined that the rich poisoning of the catalyst is in a progressed state when executing the fuel-cut operation.

A second aspect of the present invention is the control apparatus for an internal combustion engine according to the first aspect of the present invention,
wherein the oxygen supply means includes valve stopping prohibition means that prohibits the valve stopping control by the valve stopping execution means.

A third aspect of the present invention is the control apparatus for an internal combustion engine according to the second aspect of the present invention,
wherein the poisoning correlation value is an integrated fuel injection amount, and
wherein, in a case where the integrated fuel injection amount is equal to or greater than a predetermined value at a time that a request to execute the fuel-cut operation is detected, the valve stopping prohibition means prohibits the valve stopping control.

A fourth aspect of the present invention is the control apparatus for an internal combustion engine according to the first aspect of the present invention,
wherein the poisoning correlation value is an integrated fuel injection amount, and
wherein, in a case where the integrated fuel injection amount is equal to or greater than a predetermined value at a time that a request to execute the fuel-cut operation is detected, the valve stopping prohibition means delays a start timing of the valve stopping control.

A fifth aspect of the present invention is the control apparatus for an internal combustion engine according to the first aspect of the present invention, wherein the poisoning correlation value is an integrated fuel injection amount, and wherein, in a case where the integrated fuel injection amount is equal to or greater than a predetermined value at a time that a request to execute the fuel-cut operation is detected, the valve stopping prohibition means causes the at least one valve that is in the closed-valve stopped state to return to the valve operating state prior to fuel supply resumption at a time of returning from the fuel-cut operation.

A sixth aspect of the present invention is the control apparatus for an internal combustion engine according to any one of the third to fifth aspects of the present invention, further comprising:

catalyst temperature acquisition means that acquires a temperature of the catalyst; and oxygen supply restriction means that, when a temperature of the catalyst is equal to or greater than a predetermined value, restricts an oxygen supply to the catalyst by the oxygen supply means.

A seventh aspect of the present invention is the control apparatus for an internal combustion engine according to the sixth aspect of the present invention, wherein the oxygen supply restriction means halts integration processing of fuel injection amounts by the poisoning correlation value acquisition means when a temperature of the catalyst is equal to or greater than the predetermined value.

An eighth aspect of the present invention is the control apparatus for an internal combustion engine according to any one of the second to seventh aspects of the present invention, wherein the poisoning determination means includes poisoning recovery determination means that determines whether or not the catalyst has recovered from the rich poisoning while the valve stopping control is being prohibited by the valve stopping prohibition means, and wherein the control apparatus for an internal combustion engine further comprises valve stopping prohibition release means that releases prohibition of the valve stopping control by the valve stopping prohibition means if it is determined that the catalyst has recovered from the rich poisoning.

A ninth aspect of the present invention is the control apparatus for an internal combustion engine according to the eighth aspect of the present invention, wherein the poisoning recovery determination means determines that the catalyst has recovered from the rich poisoning when an integrated value of an intake air amount of the internal combustion engine is equal to or greater than a predetermined value during a fuel-cut operation that is accompanied by prohibition of the valve stopping control.

A tenth aspect of the present invention is the control apparatus for an internal combustion engine according to the eighth aspect of the present invention, further comprising air-fuel ratio detection means that is arranged in the exhaust passage on a downstream side of the catalyst and that detects an air-fuel ratio of exhaust gas, wherein, during prohibition of the valve stopping control, the poisoning recovery determination means determines that the catalyst has recovered from the rich poisoning when an air-fuel ratio of exhaust gas downstream of the catalyst that is detected by the air-fuel ratio detection means becomes leaner than a theoretical air-fuel ratio.

Advantageous Effects of Invention

According to the first aspect of the present invention, in a case of having a configuration that fundamentally executes valve stopping control during a fuel-cut operation to suppress deterioration of a catalyst, an opportunity to supply oxygen to the catalyst is secured. It is therefore possible to suppress progression of rich poisoning to a degree such that the purification capability of the catalyst decreases. Thus, according to the present invention, it is possible to favorably achieve compatibility with respect to both suppressing deterioration of a catalyst and suppressing progression of rich poisoning thereof.

According to the second aspect of the present invention, it is possible to secure an opportunity to supply oxygen to the catalyst during a fuel-cut operation by prohibition of valve stopping control. Thus, it is possible to favorably achieve compatibility with respect to both suppressing deterioration of the catalyst and suppressing progression of rich poisoning thereof.

According to the third aspect of the present invention, progression of rich poisoning can be accurately prevented by determining whether or not to prohibit valve stopping control based on an integrated fuel injection amount that has a correlation with progression of rich poisoning.

According to the fourth aspect of the present invention, an opportunity to prohibit valve stopping (opportunity to supply oxygen to the catalyst) can be secured at an initial stage when starting a fuel-cut operation by delaying the start timing of valve stopping control when a request to execute a fuel-cut operation is detected.

According to the fifth aspect of the present invention, by performing valve return prior to resuming the fuel supply when returning from a fuel-cut operation, an opportunity to prohibit valve stopping (opportunity to supply oxygen to the catalyst) can be secured immediately before returning from the fuel-cut operation.

Rich poisoning of a catalyst has a characteristic such that when the catalyst temperature is in a high temperature region in which catalyst deterioration is liable to progress, conversely, it is difficult for rich poisoning to progress. Therefore, according to the sixth aspect of the present invention, it is possible to favorably achieve compatibility with respect to both suppressing deterioration of a catalyst and suppressing progression of rich poisoning of the catalyst in a temperature region in which the catalyst temperature is high.

According to the seventh aspect of the present invention, by halting integration processing of fuel injection amounts when the temperature of the catalyst is greater than or equal to the aforementioned predetermined value, it is difficult for prohibition of valve stopping control that is carried out to suppress the progression of rich poisoning to be executed, and the supply of oxygen to the catalyst can be restricted when the catalyst temperature is in a high temperature region.

According to the eighth aspect of the present invention, a timing for releasing prohibition of valve stopping control can be accurately determined based on an integrated intake air amount that has a correlation with recovery from rich poisoning.

According to the ninth aspect of the present invention, a timing for releasing prohibition of valve stopping control can be accurately determined utilizing air-fuel ratio detection means that is arranged downstream of the catalyst.

BRIEF DESCRIPTION OF DRAWINGS

FIG. 5 is a flowchart that illustrates a routine that is executed to implement integration processing of fuel injection amounts in Embodiment 1 of the present invention;

FIG. 6 is a flowchart that illustrates a routine that is executed to implement integration processing of fuel intake air amounts in Embodiment 1 of the present invention.

Figure 1:
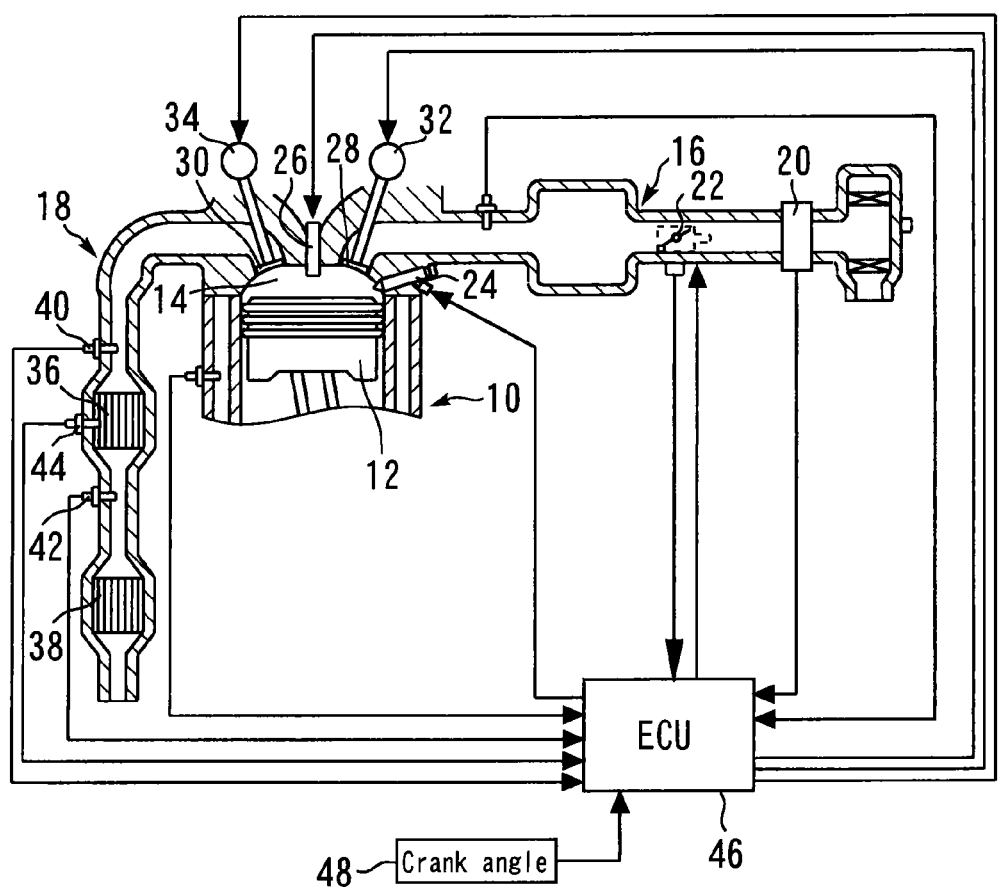
FIG. 1 is a diagram for describing the configuration of an internal combustion engine according to Embodiment 1 of the present invention.

DESCRIPTION OF SYMBOLS 10 internal combustion engine
14 combustion chamber
16 intake passage
18 exhaust passage
20 air flow meter
22 throttle valve
24 fuel injection valve
28 intake valve
30 exhaust valve
32 intake variable valve operating apparatus
34 exhaust variable valve operating apparatus
36 upstream catalyst (SC)
38 downstream catalyst (UFC)
40 main air-fuel ratio sensor
42 sub-$O_2$ sensor
44 catalyst temperature sensor
46 Electronic Control Unit (ECU)

DESCRIPTION OF EMBODIMENT

Embodiment 1
[Description of System Configuration]

FIG. 1 is a diagram for describing the configuration of an internal combustion engine 10 according to Embodiment 1 of the present invention. The system of the present embodiment includes the internal combustion engine 10. A piston 12 is provided in each cylinder of the internal combustion engine 10. A combustion chamber 14 is formed at the top side of the piston 12 in the cylinder of the internal combustion engine 10. An intake passage 16 and an exhaust passage 18 communicate with the combustion chamber 14.

An air flow meter 20 that outputs a signal in accordance with the flow rate of air that is drawn into the intake passage 16 is provided in the vicinity of an inlet of the intake passage 16. A throttle valve 22 is provided downstream of the air flow meter 20. The throttle valve 22 is an electronically controlled throttle valve that can control a degree of throttle opening independently of a degree of accelerator depression.

An in-cylinder fuel injection valve 24 for directly injecting fuel into the combustion chamber 14 (into the cylinder) is provided in a cylinder head included in the internal combustion engine 10. A spark plug 26 is also provided in the cylinder head included in the internal combustion engine 10. The spark plug 26 is arranged so as to protrude into the combustion chamber 14 from the top of the combustion chamber 14. An intake valve 28 and an exhaust valve 30 are provided in an intake port and an exhaust port, respectively. The intake valve 28 and the exhaust valve 30 are used to place the combustion chamber 14 and the intake passage 16, or the combustion chamber 14 and the exhaust passage 18 in a connecting state or a cut-off state, respectively.

The intake valve 28 and the exhaust valve 30 are driven by an intake variable valve operating apparatus 32 and an exhaust variable valve operating apparatus 34, respectively. The intake variable valve operating apparatus 32 has a valve stop mechanism that is capable of changing the operating state of the intake valve 28 between a valve operating state and a closed-valve stopped state in cylinder units. Similarly, the exhaust variable valve operating apparatus 34 has a valve stop mechanism that is capable of changing the operating state of the exhaust valve 30 between a valve operating state and a closed-valve stopped state in cylinder units. Herein, in the following description, control that switches each operating state of the intake valve 28 and the exhaust valve 30 from a valve operating state to a closed-valve stopped state is referred to as "valve stopping control". A specific configuration that realizes the above described valve stop mechanism is not particularly limited. For example, the valve stop mechanism can be realized by a configuration that, using a switching pin, is capable of pausing a rocking action of a rocker arm that transmits a working force of a cam to a valve.

Further, an upstream catalyst (SC) 36 and a downstream catalyst (UFC) 38 for purifying exhaust gas are arranged in series in the exhaust passage 18. Three-way catalysts can be used as the catalysts 36 and 38. A main air-fuel ratio sensor 40 is arranged on the upstream side of the upstream catalyst 36. A sub-$O_2$ sensor 42 is arranged between the upstream catalyst 36 and the downstream catalyst 38. The main air-fuel ratio sensor 40 is a sensor that generates a substantially linear output with respect to an air-fuel ratio of exhaust gas that flows into the upstream catalyst 36. In contrast, the sub-$O_2$ sensor 42 is a sensor that generates a rich output when exhaust gas flowing thereto from the upstream catalyst 36 is rich with respect to the theoretical air-fuel ratio, and generates a lean output when the exhaust gas is lean with respect to the theoretical air-fuel ratio. The upstream catalyst 36 includes a catalyst temperature sensor 44 for detecting the temperature thereof.

The system shown in FIG. 1 includes an ECU (Electronic Control Unit) 46. Various sensors for detecting the operational state of the internal combustion engine 10, such as, in addition to the aforementioned air flow meter 20 and the like, a crank angle sensor 48 for detecting the number of engine revolutions, are connected to an input side of the ECU 46. The various actuators that are described above are connected to an output side of the ECU 46. The ECU 46 controls the operational state of the internal combustion engine 10 based on the outputs of the above described sensors.

[Control of Embodiment 1 when Executing a Fuel-Cut Operation]

There is a concern that deterioration will occur in the upstream catalyst 36 that is arranged in the exhaust passage 18 if fresh air with a high oxygen concentration is supplied to the upstream catalyst 36 when the upstream catalyst 36 is in a high-temperature state. It is effective to prevent inflow of oxygen to the upstream catalyst 36 in order to suppress deterioration of the upstream catalyst 36. According to the system of the present embodiment that is equipped with the above described variable valve operating apparatuses 32 and 34, when a request to execute a fuel-cut (F/C) operation is generated at a time of deceleration or the like, by placing the respective operating states of the intake valve 28 and the exhaust valve 30 in a closed-valve stopped state, oxygen can be prevented from flowing into the upstream catalyst 36 during a fuel-cut operation.

On the other hand, there is a problem that, when the supply of oxygen to the upstream catalyst 36 is blocked, a precious metal of the upstream catalyst 36 is covered by reduction components in the exhaust gas such as HC or CO, and as a result a phenomenon (rich poisoning) in which the purification capability of the upstream catalyst 36 decreases is liable to occur. If such kind of rich poisoning progresses, exhaust emissions deteriorate due to the decrease in the purification capability of the upstream catalyst 36. If a configuration is adopted so that valve stopping control is always performed during a fuel-cut operation in a state in which rich poisoning of the upstream catalyst 36 is progressing, because the oxygen supply to the upstream catalyst 36 is blocked, a fuel-cut operation can no longer be utilized as an opportunity to recover from the rich poisoning.

Therefore, according to the present embodiment, the following control is performed to achieve compatibility with respect to both suppressing deterioration of the upstream catalyst 36 and suppressing the progression of rich poisoning thereof. That is, while fundamentally performing valve stopping control of the intake valve 28 and the exhaust valve 30 in synchrony with a fuel-cut operation, when it is determined that rich poisoning of the upstream catalyst 36 is in a progressed state at the time of a request to execute a fuel-cut operation, the aforementioned valve stopping control is prohibited and oxygen is supplied to the upstream catalyst 36.

More specifically, according to the present embodiment, when an integrated fuel injection amount at the time of a request to execute a fuel-cut operation is greater than or equal to a predetermined value $\beta$, it is determined that rich poisoning of the upstream catalyst 36 is in a progressed state, and then performance of valve stopping control is prohibited during the fuel-cut operation. Further, during the fuel-cut operation that is accompanied by prohibition of valve stopping control, when an integrated intake air amount becomes greater than or equal to a predetermined value $\alpha$ or when the output of the sub-$O_2$ sensor 42 inverts to a lean output, it is determined that the upstream catalyst 36 has recovered from rich poisoning and then prohibition of valve stopping control is released.

In addition according to the present embodiment, when the temperature of the upstream catalyst 36 is greater than or equal to a predetermined value $\tau$, oxygen supply to the upstream catalyst 36 by prohibition of the valve stopping control is restricted. More specifically, when the temperature of the upstream catalyst 36 is greater than or equal to the aforementioned predetermined value $\tau$, by halting integration processing of fuel injection amounts, an arrangement is made such that it becomes difficult for the prohibition of valve stopping control that is carried out to suppress the progression of rich poisoning to be executed.

Figure 2:
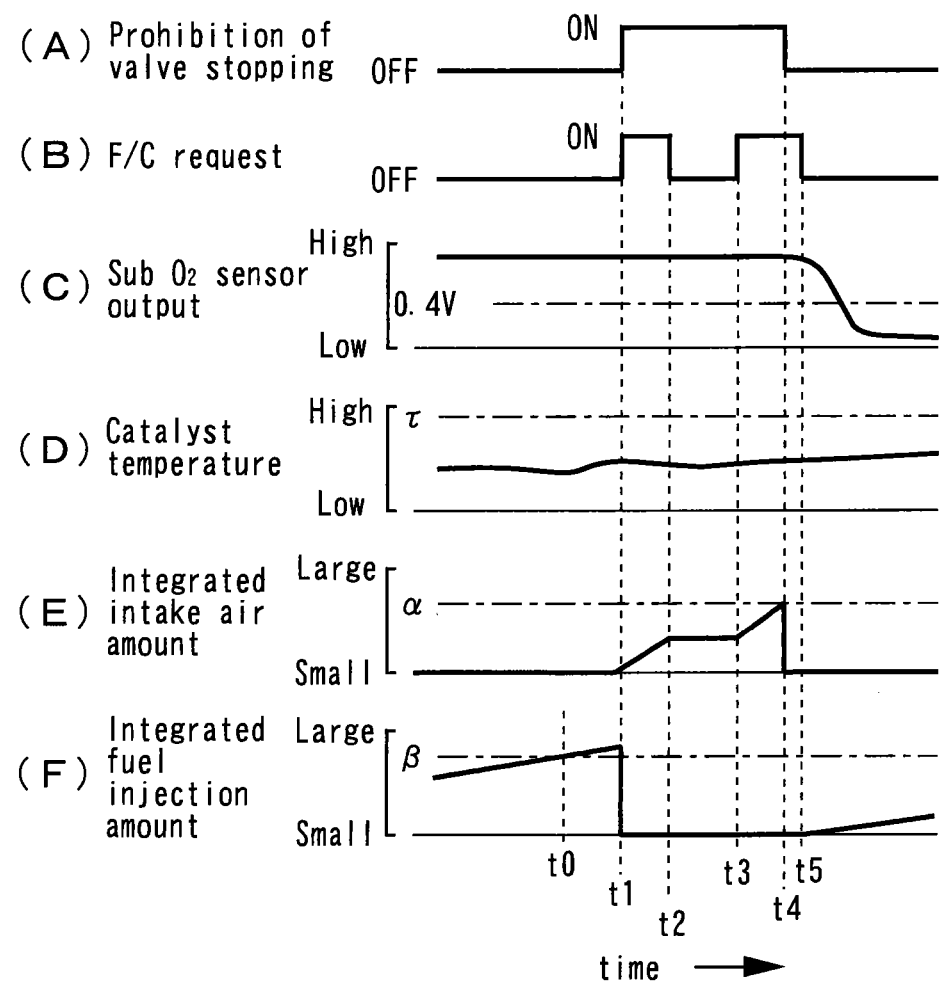
FIG. 2 is a time chart for describing an overview of control when executing a fuel-cut operation according to Embodiment 1 of the present invention.
Figure 3:
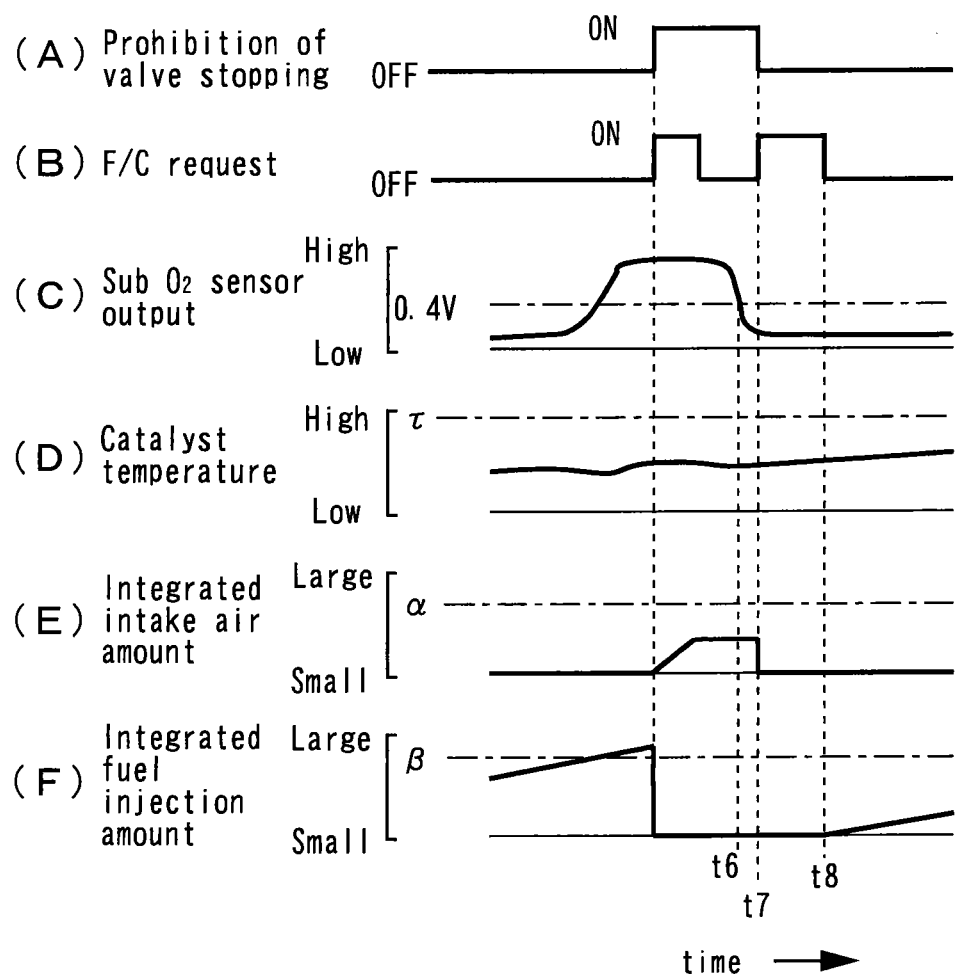
FIG. 3 is a time chart for describing an overview of control when executing a fuel-cut operation according to Embodiment 1 of the present invention.
Figure 4:
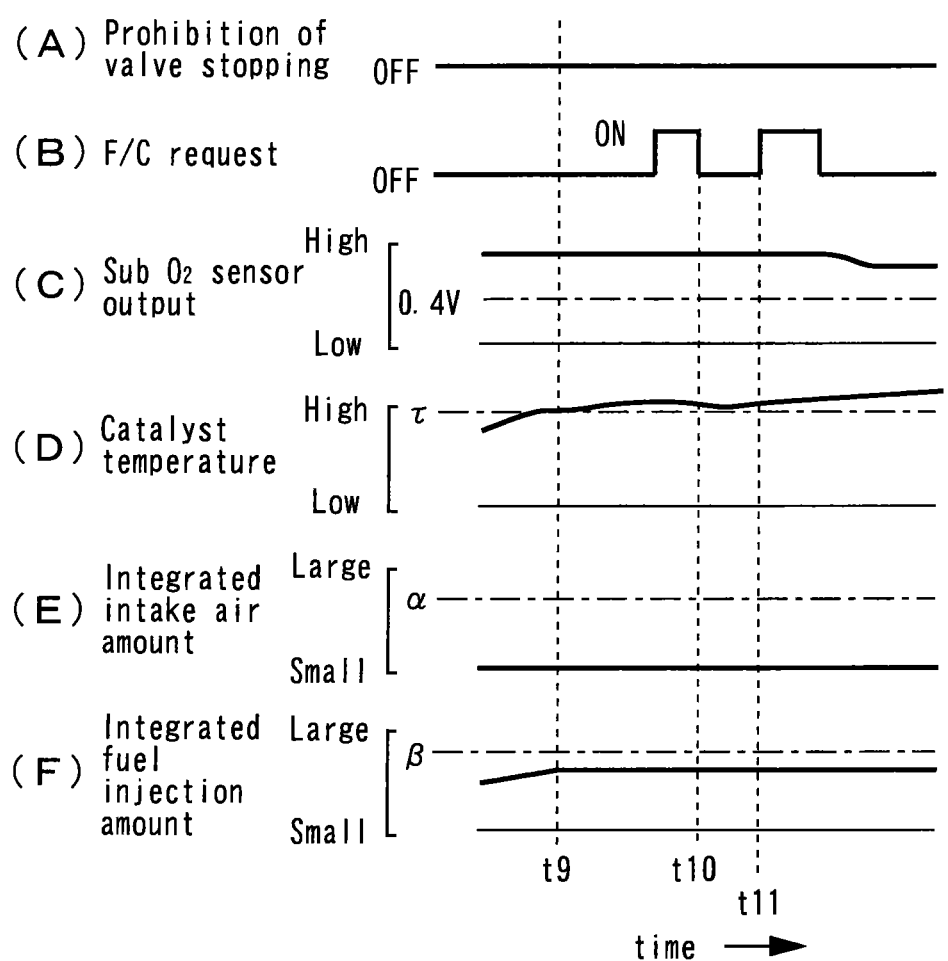
FIG. 4 is a time chart for describing an overview of control when executing a fuel-cut operation according to Embodiment 1 of the present invention.

FIG. 2 to FIG. 4 are time charts for describing an overview of control when executing a fuel-cut operation according to Embodiment 1 of the present invention.

The control example shown in FIG. 2 illustrates a case in a situation where, as shown in FIG. 2(D), the temperature of the upstream catalyst 36 is lower than the aforementioned predetermined value $\tau$. According to the control example shown in FIG. 2, when an integrated fuel injection amount at a time t0 is greater than or equal to the aforementioned predetermined value $\beta$, it is determined that rich poisoning of the upstream catalyst 36 has progressed. As a result, when a request to execute a fuel-cut operation is generated at a time t1 thereafter, prohibition of valve stopping control is executed as shown in FIG. 2(A) and integration processing of intake air amounts is started as shown in FIG. 2(E). Furthermore, at the time t1, the integrated fuel injection amount is cleared to zero.

When the request to execute a fuel-cut operation is turned off (that is, when return from the fuel-cut operation is performed) at a time t2, the integration processing of intake air amounts is halted. Thereafter, when a request to execute a fuel-cut operation is generated again at a time t3, integration processing of intake air amounts is started again. Thereafter, when the integrated intake air amount reaches the aforementioned predetermined value $\alpha$ at a time t4 during the fuel-cut operation that is accompanied by prohibition of the valve stopping control, prohibition of the valve stopping control is released (that is, valve stopping control is executed). Further, in this case, the integrated intake air amount is cleared to zero. Thereafter, when the request to execute a fuel-cut operation is turned off and fuel injection is resumed at a time t5, integration processing of fuel injection amounts is newly started.

Next, the control example shown in FIG. 3 is described. This control example also illustrates a case in a situation where, as shown in FIG. 3(D), the temperature of the upstream catalyst 36 is lower than the aforementioned predetermined value $\tau$. A difference between this control example and the control example shown in FIG. 2 is that prohibition of valve stopping control is released based on a change in the output of the sub-$O_2$ sensor, and not a change in the integrated intake air amount. That is, according to the control example shown in FIG. 3, in a situation in which the integrated intake air amount does not reach the aforementioned predetermined value $\alpha$ while valve stopping control is being prohibited, the output of the sub-$O_2$ sensor inverts to a lean output that is equal to or less than 0.4 V (see time t6). After the lean inversion of the sub-$O_2$ sensor output in this manner, prohibition of valve stopping control is released when a request to execute a fuel-cut operation is generated at a time t7 thereafter. Thereafter, when the request to execute a fuel-cut operation that is accompanied by valve stopping control is turned off (see time t8) and fuel injection is resumed, integration processing of fuel injection amounts is newly started.

Next, the control example shown in FIG. 4 is described. Unlike the two control examples described above, as shown in FIG. 4(D), this control example illustrates a case in a situation where the temperature of the upstream catalyst 36 is the aforementioned predetermined value $\tau$. More specifically, when the catalyst temperature becomes equal to or greater than the predetermined value $\tau$ at a time t9, as shown in FIG. 4(F), even during a time period (from a time t10 to a time t11) in which a fuel-cut operation is not being performed in a state in which prohibition of valve stopping control is not being executed, integration processing of fuel injection amounts is halted. As a result, prohibition of valve stopping control becomes difficult to be performed.

[Specific Processing in Embodiment 1]

Figure 7:
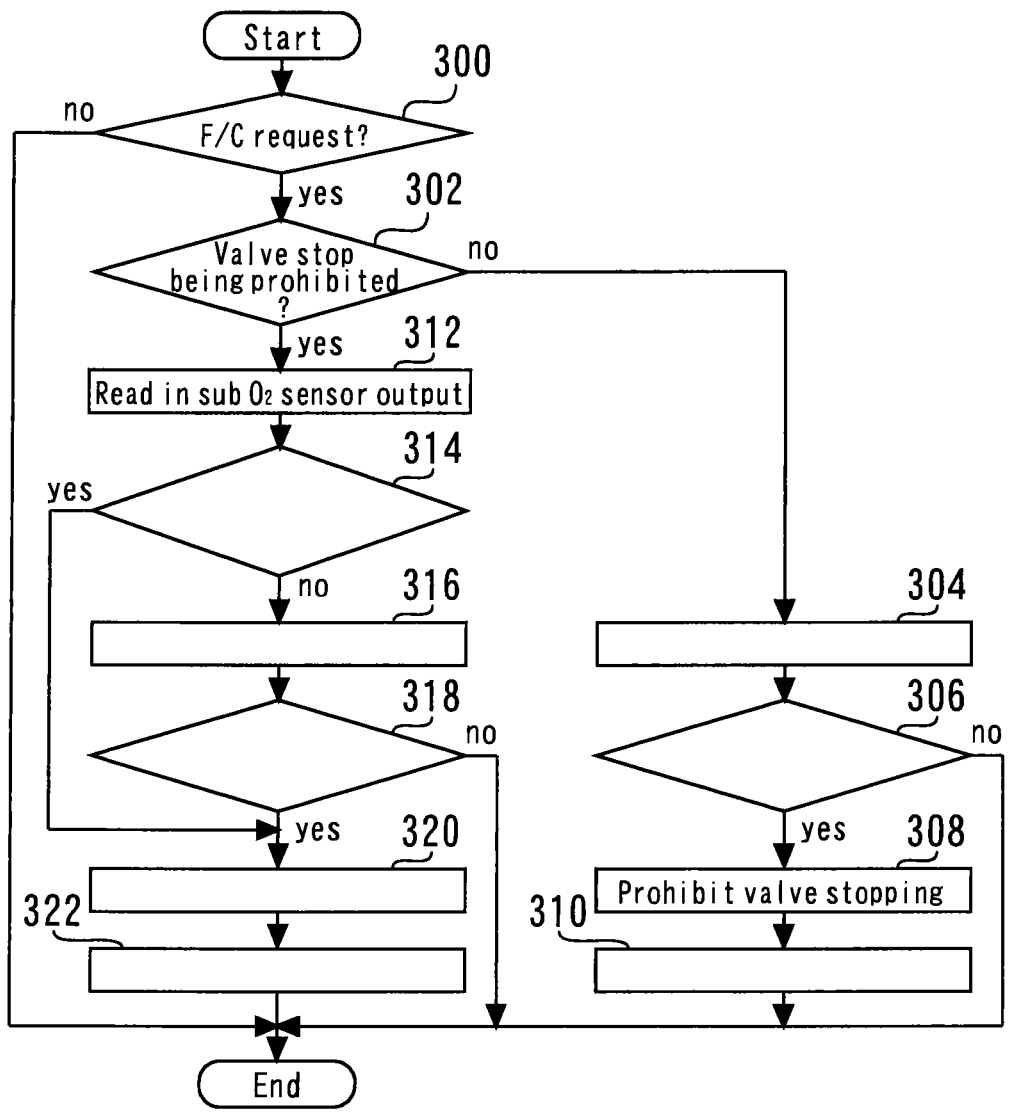
FIG. 7 is a flowchart that illustrates a main routine that is executed in Embodiment 1 of the present invention.

Next, the specific processing contents of the above described control of the present embodiment are described referring to FIG. 5 to FIG. 7.

First, integration processing of fuel injection amounts is described. FIG. 5 is a flowchart that illustrates a routine that the ECU 46 executes to implement integration processing of fuel injection amounts. In this control, the processing of the present routine is repeatedly executed at each predetermined injection timing.

According to the routine shown in FIG. 5, first, the ECU 46 reads in a temperature of the upstream catalyst 36 that is detected by the catalyst temperature sensor 44 (step 100). Next, it is determined whether or not the detected temperature of the upstream catalyst 36 is lower than the predetermined value τ (step 102). Rich poisoning of the upstream catalyst 36 has a characteristic such that when the catalyst temperature is in a high temperature region in which catalyst deterioration is liable to progress, conversely, it is difficult for rich poisoning to progress. The predetermined value τ in the present step 102 is a value that is previously set as a threshold value for determining whether or not the temperature of the upstream catalyst 36 is in such a temperature region in which it is difficult for rich poisoning to progress. Note that, instead of detecting the temperature of the upstream catalyst 36 by means of the catalyst temperature sensor 44, for example, the temperature may be acquired by estimation based on the operation record of the internal combustion engine 10.

If it is determined in the aforementioned step 102 that the temperature of the upstream catalyst 36 is lower than the predetermined value τ, it is then determined whether or not valve stopping control is not being prohibited (step 104). Whether or not to prohibit valve stopping control is determined by processing of a main routine shown in FIG. 7 that is described later. If the ECU 46 determines in the present step 104 that valve stopping control is not being prohibited, the ECU 46 reads in a fuel injection amount for the current cycle of the internal combustion engine 10 (step 106). Subsequently, integration processing of fuel injection amounts is executed (step 108). More specifically, fundamentally, the internal combustion engine 10 operates in a state in which the air-fuel ratio is controlled so as to be the theoretical air-fuel ratio. According to the present step 108, integration processing of fuel injection amounts when operating at the theoretical air-fuel ratio is performed by adding the current fuel injection amount to the previous value of the integrated fuel injection amount.

In contrast, if it is determined in the aforementioned step 102 that the temperature of the upstream catalyst 36 is equal to or greater than the predetermined value τ, integration processing of fuel injection amounts is not executed, and the current integrated fuel injection amount (current rich poisoning state) is maintained.

Next, integration processing of intake air amounts is described. FIG. 6 is a flowchart that illustrates a routine that the ECU 46 executes to implement integration processing of intake air amounts. In this control, the processing of the present routine is repeatedly executed at intervals of a predetermined time period.

According to the routine shown in FIG. 6, first, it is determined whether or not a fuel-cut operation is being executed (step 200). If it is determined as a result that a fuel-cut operation is being executed, it is determined whether or not valve stopping control is being prohibited (step 202).

If the ECU 46 determines as a result that valve stopping control is being prohibited, the ECU 46 utilizes the air flow meter 20 to read in an intake air amount (step 204). Subsequently, integration processing of intake air amounts is executed (step 206). More specifically, the current intake air amount is added to the previous value of the integrated intake air amount.

During a fuel-cut operation that is accompanied by prohibition of valve stopping control, air (fresh air) that is drawn into the internal combustion engine 10 flows as it is to the upstream catalyst 36. By integrating intake air amounts by means of the routine shown in FIG. 6, the amount of oxygen that is supplied to the upstream catalyst 36 during a fuel-cut operation that is accompanied by prohibition of valve stopping control can be ascertained.

FIG. 7 is a flowchart that illustrates a main routine that the ECU 46 executes. In this control, the processing of the present routine is repeatedly executed at intervals of a predetermined time period.

According to the routine shown in FIG. 7, first, it is determined whether or not there is a request to execute a fuel-cut operation (step 300). If it is determined as a result that there is a request to execute a fuel-cut operation, it is next determined whether or not valve stopping control is being prohibited (step 302).

If the ECU 46 determines as a result that valve stopping control is not being prohibited, the ECU 46 reads in the integrated fuel injection amount that has been calculated by the sub-routine shown in FIG. 5 as described above (step 304). Subsequently, it is determined whether or not the integrated fuel injection amount that has been read in is equal to or greater than the predetermined value β (step 306). As described above, the predetermined value β in the present step 306 is a value for determining the degree of progression of rich poisoning of the upstream catalyst 36. More specifically, to prevent rich poisoning progressing to a level at which a decrease in the purification capability of the upstream catalyst 36 is recognized, the predetermined value β is a value that is previously set as a threshold value with which it is possible to determine whether the degree of progression of rich poisoning has reached a predetermined degree of progression that is prior to a decrease in the above described purification capability.

In the aforementioned step 306, if a condition that the integrated fuel injection amount ≥ the predetermined value β is established, it can be determined that rich poisoning of the upstream catalyst 36 has progressed, and hence valve stopping control is prohibited (step 308). Next, the current integrated fuel injection amount is cleared to zero (step 310).

In contrast, if it is determined in the above described step 302 that valve stopping control is being prohibited, the ECU 46 reads in the current output of the sub-$O_2$ sensor 42 (step 312). Next, the ECU 46 determines whether or not the sub-$O_2$ sensor output that has been read in is a lean output (for example, is less than or equal to 0.4 V) (step 314).

If it is determined as a result that the sub-$O_2$ sensor output is not lean, the ECU 46 reads in the integrated intake air amount that has been calculated by the sub-routine shown in FIG. 6 that is described above (step 316). Next, it is determined whether or not the integrated intake air amount that has been read in is equal to or greater than the predetermined value α (step 318). The predetermined value α in the present step 318 is, as described above, a value that is previously set as a threshold value for determining whether or not the upstream catalyst 36 has recovered from rich poisoning.

During a period in which it is determined as a result that the condition that the integrated intake air amount ≥ predetermined value α is not yet established, valve stopping control is continued. In contrast, if it is determined that the condition that the integrated intake air amount ≥ predetermined value α is established, since it can be determined that an air amount (oxygen amount) that is required to recover from rich poisoning has been supplied to the upstream catalyst 36, the prohibition of valve stopping control is released (step 320). That is, execution of valve stopping control is permitted. Subsequently, the current integrated intake air amount is cleared to zero (step 322).

In contrast, if it is determined in the aforementioned step 314 that the sub-$O_2$ sensor output has inverted to a lean output, the ECU 46 determines that a sufficient oxygen amount required for recovery from rich poisoning has been supplied to the upstream catalyst 36 and therefore releases the prohibition of valve stopping control without waiting until it is determined in the aforementioned step 318 that the condition that the integrated intake air amount ≥ predetermined value α is established (step 320).

According to the routine shown in FIG. 7 that is described above, when it is determined that the integrated fuel injection amount is equal to or greater than the predetermined value β at the time of a request to execute a fuel-cut operation, it is determined that rich poisoning has progressed, and therefore performance of valve stopping control during the fuel-cut operation is prohibited. That is, oxygen is allowed to flow to the upstream catalyst 36 during the fuel-cut operation. Thus, in the system of the present embodiment that has a configuration that fundamentally executes valve stopping control during a fuel-cut operation in order to suppress deterioration of the upstream catalyst 36, an opportunity to supply oxygen to the upstream catalyst 36 for the purpose of recovering from rich poisoning is secured. It is therefore possible to suppress the progression of rich poisoning to a level such that the purification capability of the upstream catalyst 36 decreases. Thus, according to the system of the present embodiment, it is possible to favorably achieve compatibility with respect to both suppressing deterioration of the upstream catalyst 36 and suppressing the progression of rich poisoning thereof.

There is a correlation between progression of rich poisoning that is caused by continuing operation at the theoretical air-fuel ratio (blocking the inflow of fresh air to the upstream catalyst 36) and an integrated value of a supplied fuel amount. According to the above described routine, progression of rich poisoning can be accurately prevented by determining whether or not to prohibit valve stopping control based on such an integrated fuel injection amount. Further, according to the above described routine, the timing to release the prohibition of valve stopping control can be accurately determined based on an integrated value of a supplied oxygen amount (supplied air amount) that has a correlation with recovery from rich poisoning.

Further, according to the routine shown in the above described FIG. 5 that performs integration of fuel injection amounts, if the temperature of the upstream catalyst 36 is equal to or greater than the predetermined value τ, integration processing of fuel injection amounts is halted. As a result, in a region in which the catalyst temperature is high, it is difficult for prohibition of valve stopping control for suppressing progression of rich poisoning to be executed, and the oxygen supply to the upstream catalyst 36 is restricted. As described in the foregoing, rich poisoning of the upstream catalyst 36 has a characteristic such that when the catalyst temperature is in a high temperature region in which catalyst deterioration is liable to progress, conversely, it is difficult for rich poisoning to progress. Therefore, according to the routine shown in FIG. 7 that is described above, it is possible to favorably achieve compatibility with respect to both suppressing deterioration of the catalyst and suppressing progression of rich poisoning thereof in a temperature region in which the catalyst temperature is high.

In the above described Embodiment 1, taking an integrated fuel injection amount when operating at the theoretical air-fuel ratio as a poisoning correlation value of the present invention, it is determined that rich poisoning of the upstream catalyst 36 has progressed when the integrated fuel injection amount is equal to or greater than the predetermined value β.

Further, taking an integrated intake air amount during a fuel-cut operation that is accompanied by prohibition of valve stopping control as a poisoning correlation value of the present invention, it is determined that the upstream catalyst 36 has recovered from rich poisoning when the integrated intake air amount becomes equal to or greater than the predetermined value α. However, a method for determining whether or not rich poisoning of the catalyst has progressed according to the present invention is not limited to the above described method. More specifically, instead of the above described integrated fuel injection amount, a poisoning correlation value according to the present invention may be, for example, an operating time period of the internal combustion engine 10 when operating under theoretical air-fuel ratio control or the like. Further, instead of the aforementioned integrated intake air amount, the above described poisoning correlation value may be, for example, an operating time period of the internal combustion engine 10 during a fuel-cut operation that is accompanied by prohibition of valve stopping control or the like. Furthermore, instead of the above described determination method, a method may be adopted which determines that rich poisoning of the upstream catalyst 36 has progressed when the output of the sub-$O_2$ sensor 42 during theoretical air-fuel ratio operation does not exhibit a lean output over a predetermined time period.

Further, the above described Embodiment 1 has been described using an example of a configuration in which the operating states of both the intake valve 28 and the exhaust valve 30 are switched to a closed-valve stopped state when performing valve stopping control when executing a fuel-cut operation. However, the operating states of the intake valve 28 and the exhaust valve 30 need not both be switched to a closed-valve stopped state for the purpose of preventing an inflow of fresh air to the upstream catalyst 36 when executing a fuel-cut operation according to the present invention. That is, a configuration may be adopted in which only the operating state of either one of the intake valve 28 and the exhaust valve 30 is switched to the closed-valve stopped state.

In the above described Embodiment 1, a configuration is adopted so that if the integrated fuel injection amount is equal to or greater than the predetermined value β at the time of a request to execute a fuel-cut operation, thereafter valve stopping control is prohibited until the integrated intake air amount becomes equal to or greater than the predetermined value α. However, the present invention is not limited thereto. More specifically, for example, a configuration may be adopted so that if the integrated fuel injection amount is equal to or greater than the predetermined value β at the time of a request to execute a fuel-cut operation, control is performed that secures an opportunity for valve stopping prohibition (an opportunity to supply oxygen to the upstream catalyst 36) at an initial stage when starting a fuel-cut operation by delaying the start timing of valve stopping control.

In addition, if the situation is one in which it is possible to predict in advance the timing of return from a fuel-cut operation, such as in the case of a fuel-cut operation of a kind in which return (a so-called "natural return") from the fuel-cut operation is performed when the number of engine revolutions reaches a predetermined number of return revolutions, when the integrated fuel injection amount at the time of a request to execute a fuel-cut operation is equal to or greater than the predetermined value β, for example, the following kind of control may be performed. That is, control may be performed that causes the operating state of the intake valve 28 and the exhaust valve 30 to return to a valve operating state prior to the resumption of fuel injection when returning from a fuel-cut operation to thereby secure an opportunity for prohibiting valve stopping (opportunity to supply oxygen to the upstream catalyst 36) immediately prior to return from the fuel-cut operation.

Furthermore, the above described Embodiment 1 is configured so that, when an integrated fuel injection amount at the time of a request to execute a fuel-cut operation is equal to or greater than the predetermined value β, valve stopping control is prohibited so that oxygen is allowed to flow into the upstream catalyst 36. However, an oxygen supply method according to the present invention is not limited to a method which supplies intake air that has passed through the combustion chamber 14 in this manner. That is, for example, a configuration may be adopted that includes a secondary air supply channel for the upstream catalyst 36, and which supplies oxygen thereto from outside. Further, when the case of a hybrid vehicle that has a configuration that includes an internal combustion engine and a motor as power sources and that can drive the internal combustion engine using the motor is assumed, if the hybrid vehicle is configured so that rotation of the internal combustion engine 10 stops when executing a fuel-cut operation, a configuration may be adopted so as to supply oxygen to the catalyst by driving (pumping) the internal combustion engine by means of the motor while prohibiting valve stopping control of the intake and exhaust valves when executing a fuel-cut operation.

Further, in the above described Embodiment 1, a configuration is adopted so that if it is determined that rich poisoning of the catalyst 36 is in a progressed state at the time of a request to execute a fuel-cut operation, valve stopping control is prohibited so that oxygen may be supplied to the catalyst 36. However, the present invention is not limited thereto. For example, a configuration may also be adopted so that oxygen is supplied to the catalyst in a case where rich poisoning of the catalyst has progressed during execution of a fuel-cut operation that is accompanied by valve stopping control.

Note that, with respect to the above described Embodiment 1, the valve stop mechanisms of the intake variable valve operating apparatus 32 and the exhaust variable valve operating apparatus 34 correspond to a "valve stop mechanism" according to the first aspect of the present invention, "fuel-cut operation execution means" according to the first aspect of the present invention is realized by the ECU 46 stopping fuel injection by the in-cylinder fuel injection valve 24 when a predetermined execution condition is established, "valve stopping execution means" according to the first aspect of the present invention is realized by the ECU 46 executing valve stopping control with respect to the intake and exhaust valves 28 and 30 using the variable valve operating apparatuses 32 and 34 at the time of a request to execute a fuel-cut operation, "poisoning correlation value acquisition means" according to the first aspect of the present invention is realized by the ECU 46 executing the processing of the routine shown in the above described FIG. 5, "poisoning determination means" according to the first aspect of the present invention is realized by the ECU 46 executing the processing of the aforementioned steps 304 and 306, and "oxygen supply means" according to the first aspect of the present invention is realized by the ECU 46 executing the processing of the aforementioned step 308 during a fuel-cut operation.

In addition, "valve stopping prohibition means" according to the second aspect of the present invention is realized by the ECU 46 executing the processing of the aforementioned step 308.

Further, "catalyst temperature acquisition means" according to the sixth aspect of the present invention is realized by the ECU 46 executing the processing of the aforementioned step 100, and "oxygen supply restriction means" according to the sixth aspect of the present invention is realized by the ECU 46 halting integration processing of fuel injection amounts when the result determined in the aforementioned step 102 is negative.

Furthermore, "poisoning recovery determination means" according to the eighth aspect of the present invention is realized by the ECU 46 executing the processing of the aforementioned steps 312 to 314 or steps 316 to 318, and "valve stopping prohibition release means" according to the eighth aspect of the present invention is realized by the ECU 46 executing the processing of the aforementioned step 320.

Further, "air-fuel ratio detection means" according to the tenth aspect of the present invention is realized by the ECU 46 executing the processing of the aforementioned step 312.

The invention claimed is:

1. A control apparatus for an internal combustion engine, comprising:
    valve stop means for changing an operating state of at least one valve among an intake valve and an exhaust valve between a valve operating state and a closed-valve stopped state;
    fuel-cut operation execution means for executing a fuel-cut operation in a case where a predetermined execution condition is established during operation of the internal combustion engine;
    valve stopping execution means for performing valve stopping control that changes an operating state of the at least one valve to the closed-valve stopped state when executing the fuel-cut operation;
    poisoning correlation value acquisition means for acquiring a poisoning correlation value that has a correlation with progression of rich poisoning of a catalyst that is arranged in an exhaust passage of the internal combustion engine;
    poisoning determination means for determining whether or not rich poisoning of the catalyst has progressed based on the poisoning correlation value; and
    oxygen supply means for supplying oxygen to the catalyst in a case where it is determined that the rich poisoning of the catalyst is in a progressed state when executing the fuel-cut operation,
    wherein the oxygen supply means includes valve stopping prohibition means for prohibiting the valve stopping control by the valve stopping execution means, and for supplying oxygen to the catalyst by prohibiting the valve stopping control,
    wherein the poisoning determination means includes poisoning recovery determination means for determining whether or not the catalyst has recovered from the rich poisoning while the valve stopping control is being prohibited by the valve stopping prohibition means, and
    wherein the control apparatus for an internal combustion engine further comprises valve stopping prohibition release means for releasing prohibition of the valve stopping control by the valve stopping prohibition means if it is determined that the catalyst has recovered from the rich poisoning.

2. The control apparatus for an internal combustion engine according to claim 1,
    wherein the poisoning correlation value is an integrated fuel injection amount, and
    wherein, in a case where the integrated fuel injection amount is equal to or greater than a predetermined value at a time that a request to execute the fuel-cut operation is detected, the valve stopping prohibition means prohibits the valve stopping control.

3. The control apparatus for an internal combustion engine according to claim 2,
wherein directly after the valve stopping prohibition means prohibits the valve stopping control, the integrated fuel injection amount is cleared.

4. The control apparatus for an internal combustion engine according to claim 1,
wherein the poisoning correlation value is an integrated fuel injection amount, and
wherein, in a case where the integrated fuel injection amount is equal to or greater than a predetermined value at a time that a request to execute the fuel-cut operation is detected, the valve stopping prohibition means delays a start timing of the valve stopping control.

5. The control apparatus for an internal combustion engine according to claim 1,
wherein the poisoning correlation value is an integrated fuel injection amount, and
wherein, in a case where the integrated fuel injection amount is equal to or greater than a predetermined value at a time that a request to execute the fuel-cut operation is detected, the valve stopping prohibition means causes the at least one valve that is in the closed-valve stopped state to return to the valve operating state prior to fuel supply resumption at a time of returning from the fuel-cut operation.

6. The control apparatus for an internal combustion engine according to claim 1, further comprising:
catalyst temperature acquisition means for acquiring a temperature of the catalyst; and
oxygen supply restriction means for restricting an oxygen supply to the catalyst by the oxygen supply means, when a temperature of the catalyst is equal to or greater than a predetermined value.

7. The control apparatus for an internal combustion engine according to claim 6,
wherein the oxygen supply restriction means halts integration processing of fuel injection amounts by the poisoning correlation value acquisition means when the temperature of the catalyst is equal to or greater than the predetermined value.

8. The control apparatus for an internal combustion engine according to claim 1,
wherein the poisoning recovery determination means determines that the catalyst has recovered from the rich poisoning when an integrated value of an intake air amount of the internal combustion engine is equal to or greater than a predetermined value during a fuel-cut operation that is accompanied by prohibition of the valve stopping control.

9. The control apparatus for an internal combustion engine according to claim 1, further comprising air-fuel ratio detection means for detecting an air-fuel ratio of exhaust gas, the air-fuel detection means being arranged in the exhaust passage on a downstream side of the catalyst, and
wherein, during prohibition of the valve stopping control, the poisoning recovery determination means determines that the catalyst has recovered from the rich poisoning when an air-fuel ratio of exhaust gas downstream of the catalyst that is detected by the air-fuel ratio detection means becomes leaner than a theoretical air-fuel ratio.

10. A control apparatus for an internal combustion engine, comprising:
a valve stop mechanism to change an operating state of at least one valve among an intake valve and an exhaust valve between a valve operating state and a closed-valve stopped state; and
a controller programmed to:
execute a fuel-cut operation in a case where a predetermined execution condition is established during operation of the internal combustion engine;
perform valve stopping control that changes an operating state of the at least one valve to the closed-valve stopped state when executing the fuel-cut operation;
acquire a poisoning correlation value that has a correlation with progression of rich poisoning of a catalyst that is arranged in an exhaust passage of the internal combustion engine;
determine whether or not rich poisoning of the catalyst has progressed based on the poisoning correlation value; and
supply oxygen to the catalyst in a case where it is determined that the rich poisoning of the catalyst is in a progressed state when executing the fuel-cut operation,
wherein the controller prohibits the valve stopping control to supply oxygen to the catalyst,
wherein the controller determines whether or not the catalyst has recovered from the rich poisoning while the valve stopping control is being prohibited, and
wherein the controller releases prohibition of the valve stopping control if it is determined that the catalyst has recovered from the rich poisoning.

* * * * *